United States Patent Office 3,729,453
Patented Apr. 24, 1973

3,729,453
PROCESS FOR THE PREPARATION OF POLY-
AMIDOXIMES AND POLYBENZIMIDAZOLE
(PBI)TYPE POLYMERS DERIVED THEREFROM
Carl N. Zellner, New Hope, Pa., and Henry W. Steinman,
Sparta, N.J., assignors to Celanese Corporation, New
York, N.Y.
No Drawing. Filed Oct. 30, 1970, Ser. No. 85,752
Int. Cl. C08g 33/02
U.S. Cl. 260—79.3 R     22 Claims

ABSTRACT OF THE DISCLOSURE

Process for the preparation of polymers which comprises reacting at temperatures of from about 0° to about 250° C. an aromatic diamine with a bis(hydroxamoyl halide) or a derivative thereof to form a polyamidoxime, which may then be subjected to ring closing conditions to form polybenzimidazole (PBI) type polymers. Formation of the polyamidoxime is preferably conducted in the presence of a solvent, which may or may not also function as an acid-acceptor; if not, then preferably also in the presence of an acid-acceptor. The preferred acid-acceptors are those which are insoluble in the reaction mixture—most preferably melamine. The ring closure may be conducted in the presence of a catalyst at temperatures of from about 0° to about 250° C. or by reaction with an aromatic sulfonyl halide at temperatures of from about 0° to about 90° C. Reactive amine or hydroxamoyl halide terminal groups of the polyamidoximes or PBI type polymers may be reacted with other compounds or polymers which contain groups reactive therewith in order to further extend the polymer chains. In a preferred prior step, aromatic bis(hydroxamoyl halide) reactants are made by the reaction of dialkyl aromatic precursors, e.g., any of the isomers of xylene, with, e.g., nitrosyl halide. Novel polyamidoximes.

---

This invention relates to a novel process for the preparation of polyamidoximes and of polybenzimidazole (PBI) type polymers produced therefrom.

Polyamidoximes are useful as chelating agents for sequestering polyvalent metal ions in plating baths, polluted streams etc. The polymers are also useful as catalyst carriers and as ion-exchange resins. The polymers may be formed into fibers, films, molded articles etc. Instead of undergoing ring closure to form the PBI type polymers of this invention, the polyamidoximes may be hydrolyzed to high performance polyamides by reaction with, e.g., dilute hydrochloric acid, or their oxime groups may be hydrogenated under appropriate conditions to amine groups to form polyamines, which are also useful as chelating agents. The polyamines may be reacted with polyepoxides to form epoxy resins and molded articles, or they may be crosslinked with dicarboxylic acids to form polyamide resins of interesting and varied properties.

The PBI polymers of this invention generally are useful for applications where high performance polymers are required. For example, in aerospace applications where retention of strength at elevated temperatures and flame retardancy are required, the PBI polymers of this invention are outstanding. Heretofore, Nomex® polyamide type resins have been used in coveralls etc. worn by pilots and race car drivers to protect against injuries from fires resulting from crashes etc. Unfortunately, Nomex® garments are not as non-flammable as desired. In addition, wearers of these garments have complained that they are clammy, especially when worn in a closed cockpit. PBI type polymers are much less flammable than Nomex® resins. Garments made from PBI type polymers are not clammy, especially when the fabric in the garment is woven from staple, which fabric has the feel of cotton.

Heretofore, PBI type polymers have been made by the reaction of diamobenzidine with a dicarboxylic acid or a derivative thereof. Over-all this process is undesirable because it is expensive and also because of toxicity problems. The diamobenzidine is difficult to synthesize and difficult to purify, thereby resulting in a very expensive starting material. This compound is also highly toxic. The other starting material is usually diphenylisophthalate, which is also relatively expensive because it is not, as of now, an article of commerce. Another drawback to the prior art process is that relatively high temperatures are required, e.g., temperatures in the range of about 390° C. or higher. PBI type polymers produced by the process of the prior art have been limited in applicability because of the tan color of the polymer. The PBI polymers of the present invention may be obtained white or nearly white. In any event, they are much lighter in color than the PBI type polymers of the prior art and may be dyed to almost any desired color.

One or more of the foregoing and other adverse effects of the prior art process are overcome by the novel process of the present invention.

Generally, the process of the present invention comprises reacting an aromatic diamine with a bis(hydroxamoyl halide) or a derivative thereof to form the polyamidoxime, which may then be subjected to ring closing conditions to form the PBI type polymers of this invention.

Illustrative of the aromatic diamines which may be used in the present invention are those which may be depicted by the following general formula:

$$\text{H--N(R)--Y--N(R)--H},$$

wherein R is as defined below and Y is $-C_6H_4-$, $-C_{10}H_6-$, $-C_{14}H_8-$, $-C_6H_4-C_6H_4$, $$-C_6H_4-R'-C_6H_4-,$$

wherein R' is as defined below, and the like, Y may be substituted with groups which do not detrimentally interfere with the reaction.

Illustrative subcategories of the diamines which may be used are:

(I) Compounds of the general formula $$\text{H--N(R)--Z--N(R)--H},$$

wherein R in each instance may independently be hydrogen or a group which does not detrimentally interfere with the reaction such as hydrocarbyl, e.g., alkyl, cycloalkyl, aryl, alkaryl, aralkyl, or the like; and Z is $-C_6H_4-$, $-C_{10}H_6-$, $-C_{14}H_8-$;

(II) Compounds of the general formula $$\text{H--N(R)--C}_6\text{H}_4\text{--C}_6\text{H}_4\text{--N(R)--H},$$

wherein R is as defined above; and (III) Compounds of the general formula $$\text{H--N(R)--C}_6\text{H}_4\text{--R'--C}_6\text{H}_4\text{--N(R)--H},$$

wherein R is as defined above and R' may be $$-CH_2-,\ -\overset{O}{\underset{\|}{C}}-,\ -\overset{O}{\underset{\|}{S}}-,\ -\overset{O}{\underset{\underset{O}{\|}}{\overset{\|}{S}}}-,\ -\overset{CH_3}{\underset{CH_3}{\overset{|}{C}}}-,\ -S-,\ -O-,\ -\overset{H}{\underset{|}{N}}-,$$

$$-CH_2-\!\!\left\langle\ S\ \right\rangle\!\!-CH_2-,\ \left\langle\ S\ \right\rangle,\ -\overset{CH_3}{\underset{CH_3}{\overset{|}{Si}}}-,\ -\overset{C_2H_5}{\underset{C_2H_5}{\overset{|}{Si}}}-,\ -\overset{C_6H_5}{\underset{C_6H_5}{\overset{|}{Si}}}-$$

or the like.

Illustrative of the R groups are the alkyl groups such as methyl, ethyl, propyl, isopropyl and the like; cycloalkyl groups such as cyclohexyl, and the like; the aryl groups such as phenyl; the alkaryl groups such as the methyl phenyls, the ethylphenyls, the dimethylphenyls, and the like; the aralkyl groups such as the phenylmethyl and phenylethyl groups, and the like. Preferably R contains up to about 8 carbon atoms, more preferably up to about 6 carbon atoms. It is particularly preferred that R be phenyl.

Illustrative of particular aromatic diamines which may be used in the process of this invention are the following:

m-phenylene diamine
p-phenylene diamine
o-phenylene diamine
1,4-naphthalene diamine
1,5-naphthalene diamine
1,6-naphthalene diamine
1,7-naphthalene diamine
1,8-naphthalene diamine
2,3-naphthalene diamine
2,6-naphthalene diamine
2,7-naphthalene diamine
1,4-diamino-2-methyl-naphthalene
1,4-diamino-anthracene
2,6-diamino-anthracene
9,10-diamino-anthracene
9,10-diamino phenanthrene
2,2′-diamino-biphenyl
2,4′-diamino-biphenyl
3,3′-diamino-biphenyl
3,4′-diamino-biphenyl
4,4′-diamino-biphenyl
N,N′-diethyl benzidine
N,N′-dipropyl benzidine
N,N′-dicyclohexyl benzidine
N,N′-diphenyl benzidine
4,4′-diamino-2,2′-dimethyl-biphenyl
1,1-bis(4-aminophenyl) cyclohexane
bis(4-aminophenyl)dimethyl silane
bis(4-aminophenyl) diethyl silane
bis(4-aminophenyl) diphenyl silane
bis(4-aminophenyl) amine
bis(4-aminophenyl) ether, i.e. 4,4′-diamino diphenyl ether
bis(4-aminophenyl) thioether
2,2-bis(4-aminophenyl) propane
bis(4-aminophenyl) sulfone
bis(4-aminophenyl) sulfoxide
bis(4-aminophenyl) ketone
bis(4-aminophenyl) methane By the term "aromatic diamine" is meant a compound in which the two amino groups are each attached to an aromatic ring, not necessarily both to the same ring, however. Generally, any aromatic diamine containing up to about 30 carbon atoms can be used in the present invention. Preferably, the diamine contains up to about 20 carbon atoms, most preferably up to about 15 carbon atoms. The most preferred diamines are benzidine and oxydianiline.

Bis(hydroxamoyl halides) which may be used in this invention may be either aliphatic or aromatic and may be, e.g., the chlorides, bromides, or iodides. The chlorides and bromides are generally preferred. Derivatives of those compounds, e.g., the O-sulfonates, may be used instead. The compounds are illustrated by the following formula:

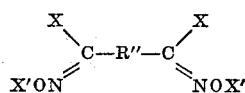

wherein X is halogen or —OR‴, —SR‴ (R‴ is alkyl of up to 4 carbon atoms) or —OC$_6$H$_5$; R″ is a direct bond or a divalent aliphatic, aromatic or organosilicon group; and X′ is hydrogen or an —SO$_2$OK, —SO$_2$ONa,

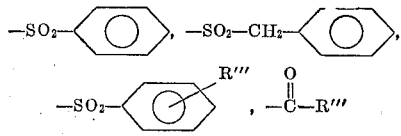

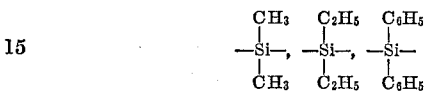

(R‴ is alkyl of up to 4 carbon atoms) or —SO$_2$—CH$_3$ group. Illustrative of the aliphatic groups represented by R″ are —CH$_2$—, —C$_2$H$_4$—, —C$_3$H$_6$—, —C$_4$H$_8$—, and the like. Illustrative of the organosilicon groups are $$-\overset{CH_3}{\underset{CH_3}{Si}}-, \quad -\overset{C_2H_5}{\underset{C_2H_5}{Si}}-, \quad -\overset{C_6H_5}{\underset{C_6H_5}{Si}}-$$

and the like. Illustrative of the aromatic groups represented by R″ are —C$_6$H$_4$—, —C$_6$H$_4$·C$_6$H$_4$—, —C$_{10}$H$_6$—, —C$_{14}$H$_8$—, (—C$_6$H$_4$—)$_2$R⁗, wherein R⁗ is —O—, —S—,

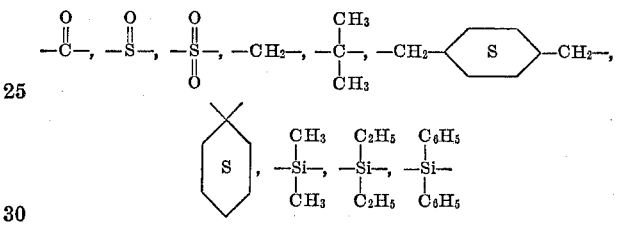

and the like. It is preferred that R″ be an aliphatic or aromatic divalent group. It is further preferred that R″ contain up to about 18 carbon atoms if R″ is aromatic and up to about 4 carbon atoms if R″ is aliphatic. If R″ is a divalent organosilicon group it is preferred that it contain up to about 12 carbon atoms, most preferably up to 4 carbon atoms. R″ is most preferably —C$_6$H$_4$—.

Illustrative of particular bis(hydroxamoyl halides) are the following:

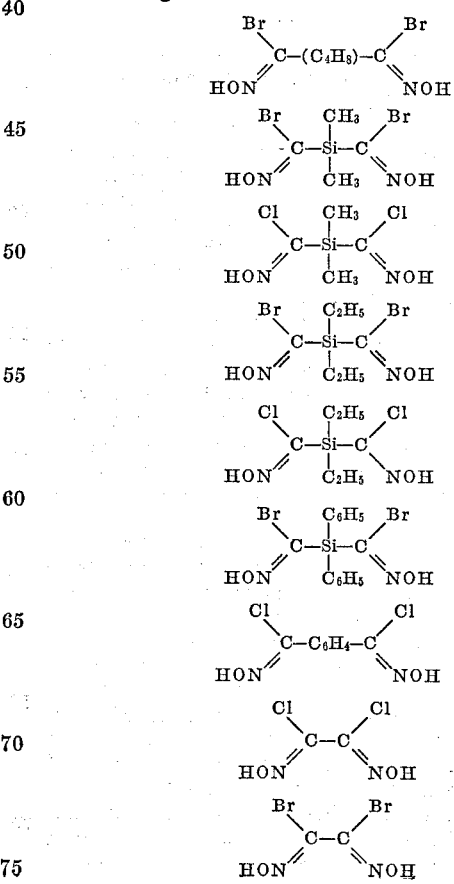

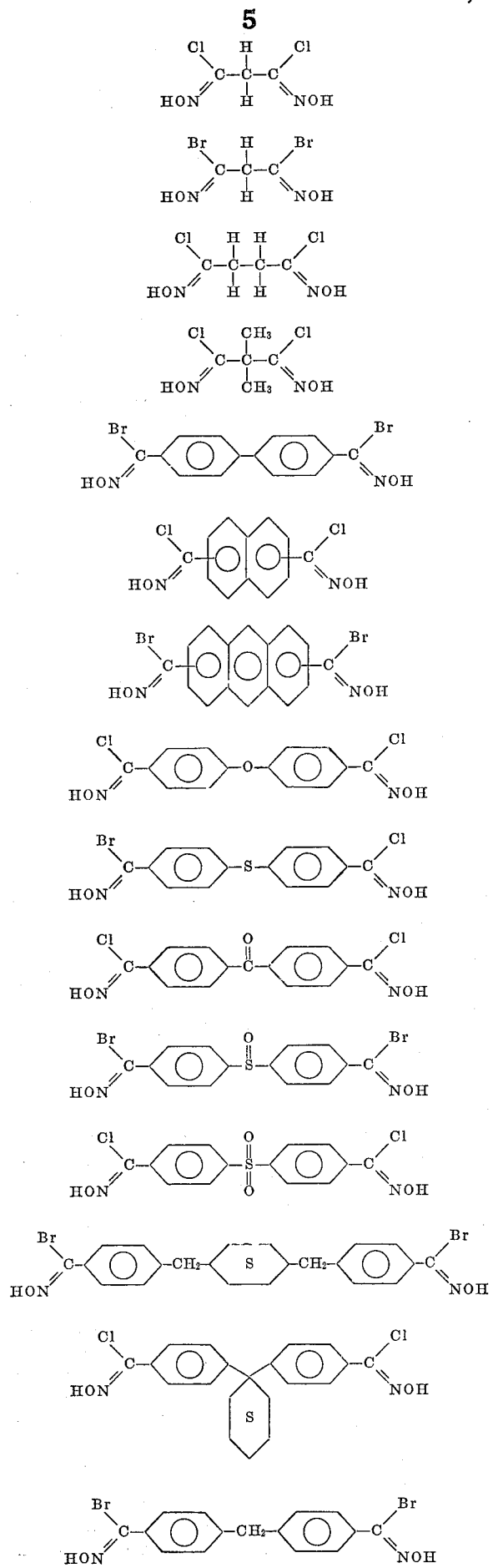
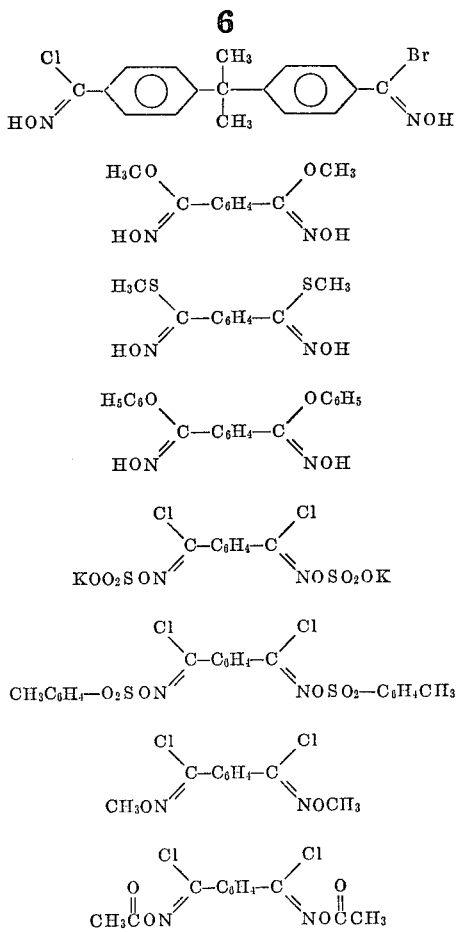

Generally, equimolar quantities of the reactants are used to form the polymers of this invention. However, it is possible to terminate the polymer chains with either hydroxamoyl halide groups or amino groups merely by utilizing in the reaction an excess of the reactant containing either of those groups. To obtain relatively high intrinsic viscosity polymer, it is generally preferred that the excess not exceed about 5 mole percent.

When the polymer is terminated by hydroxamoyl halide groups, they may be reacted with compounds or polymers containing at least one group, preferably two groups, which is (are) reactive therewith under the conditions of the reaction. Such groups may be, for example, amines or phenoxides.

When an excess of the diamine is used, the excess will function as an acid-acceptor. Excess diamine may also function as chain-stoppers, or end-blocking units, the terminal amine groups of which may serve as reactive groups through which the chain may be further extended by reaction with other compounds containing at least one group, preferably two groups, which is (are) reactive with the amine groups under the reaction conditions. Such groups and compounds are, for example, hydroxamoyl halide; isocyanate; halogen, e.g., chlorine and bromine; epoxide; acid chlorides, e,g., adipoyl chloride; carboxy, e.g., adipic acid, tetracarboxy-naphthalene; amine (condensation reaction); $SO_2Cl_2$; phosgene (to form a urea linkage or to form isocyanate groups depending on reaction conditions, which latter groups may be converted to urethane linkages by reaction with polyols); hydrazine (to form semicarbazides); phosgenated diols (aliphatic or aromatic bis-chlorocarbonates [to form urethane linkages]).

Of course, it will be obvious to one skilled in the art that mixed polymers may be produced by polymerizing more than one of either or each of the two reactants. These mixed polymers may be either random or alternating and may be formed from using mixtures of different species of either or both reactants, or they may be block polymers, which may be formed by reacting an amine-terminated polymer of relatively low molecular weight with a hydroxamoyl halide terminated polymer of relatively low molecular weight which has itself been formed from a diamine or hydroxamoyl halide which is different from that used to form the first polymer. The relatively low molecular weight polymers may instead be substantially the same except for one being amine-terminated and the other hydroxamoyl halide terminated, and possibly differences in molecular weight and configuration.

Cyclization of the polyamidoxime polymers may be accomplished before or after linking in the manner just described. If cyclization is to be performed before linking, the terminal amino groups may need protection, e.g., by acetylation, before cyclization is conducted. After cyclization, the protected groups are reconverted to amine groups by hydrolysis, before linking.

Although the two reactants could be directly contacted together, especially when one or both are liquids or when the reaction temperature is high enough to melt one or both, it is preferable to conduct the reaction in the presence of a solvent. The solvent may be inert or may function as an acid-acceptor to remove the by-product hydrogen halide formed during the reaction.

Illustrative of the inert solvents which may be used are $N_2O_4$; acetonitrile; nitrated solvents, e.g., nitromethane and nitrobenzene; chlorinated solvents, e.g., methylene chloride, chloroform, carbon tetrachloride, ethylene chloride, and chlorobenzene; the ethers, e.g., tetrahydrofurane, diethyl ether, and dioxane; the esters, e.g., amyl acetate; the lactones, e.g., butyrolactone; ketones, e.g., cyclopentanone, cyclohexanone; acetic acid; polyphosphoric acid and cresols. Cyclohexanone and polyphosphoric acid are preferred.

If an inert solvent has been used, it is desirable to add to the mixture an acid-acceptor such as a tertiary amine, e.g., trialkylamines such as trimethylamine, triethylamine, and the like; triethylene diamine; 1,3-dimethylamino butane; heterocyclic amines such as pyridine, picolines, lutidines; or an alkali metal or alkaline earth metal hydroxide, bicarbonate, carbonate, or alkanoate (up to 4 carbon atoms), e.g., sodium hydroxide, sodium carbonate, sodium bicarbonate, potassium acetate, etc.

Particularly useful acid-acceptors are those insoluble in the reaction mixture, e.g., melamine, benzoguanamine, dicyanamide, insoluble guanidine derivatives, insoluble basic ion-exchange resins. Preferred are melamine and benzoguanamine. Of course, mixtures of the acid-acceptors may be used. The aforementioned acid-acceptors may be used in conjunction with the following solvents which also function as acid-acceptors.

Illustrative of the inert solvents which may be used are acceptors are dimethylacetamide (DMAc), dimethylformamide (DMF), pyrrolidone, and its alkylated derivatives, e.g., N-methylpyrrolidone, dimethyl sulfoxide (DMSO), hexamethylphosphoramide, dialkylanilines, e.g. dimethylaniline and diethylaniline, and the like. DMAc is preferred.

In place of a single solvent in the reaction mixture, there may be used mixed solvent systems containing either or both types of solvents.

In order to avoid undesirable side reactions, it is preferable to use either an acid-acceptor which is insoluble in the reaction mixture, preferably melamine, or to use a soluble amine but ensure that its instantaneous concentration in the reaction mixture is relatively low, e.g., lower than 0.01 molar concentration—for example, by slowly and continuously adding the acid-acceptor or by incrementally adding small portions. Other ways of inhibiting undesirable side reactions are indicated in the schemata which follow.

The reaction of the bis(hydroxamoyl halide) or derivative with the aromatic diamine is generally exothermic and may be conducted at autogenous temperature, or it may be conducted at a constant temperature by the application of the required cooling or heating conditions. The reaction may be conducted at temperatures of from about 0° to about 250° C., preferably about 0° to about 100° C.

The closing of the ring to actually form the PBI type polymers may be accomplished by the appropriate thermal conditions, e.g., by heating the amidoxime polymer to a temperature in the range of about 0° C. to 250° C., preferably in the presence of a catalyst, especially an acidic catalyst such as silica gel, silica-alumina, sulfonated polystyrene ion-exchange resins, and polyphosphoric acid. Polyphosphoric acid is the preferred catalyst.

Ring closure may also be accomplished by the reaction of the amidoxime polymer with a sulfonyl halide, such as benzene sulfonyl chloride, naphthalene sulfonyl chloride, toluene sulfonyl chloride, methane sulfonyl chloride, or other ring closing reagents under appropriate conditions, e.g., about 0° C. to about 90° C. or higher, preferably about 5° C. The aromatic sulfonyl halides are preferred. Toluene sulfonyl chloride is most preferred.

The aromatic diamines are either readily available or easily prepared by methods which are well-known to those skilled in the art. For example, benzidine may be prepared by the palladium-catalyzed hydrogenation of nitrobenzene in alkaline medium to form hydrazobenzene, which is then rearranged in the presence of, e.g., hydrochloric acid to form the desired product.

The bis(hydroxamoyl halide), the other reactant in the novel process of this invention, may be prepared by several routes. For example, the appropriate aliphatic or aromatic dialdehyde, such as terephthaladehyde or isophthaladehyde, may be reacted with hydroxylamine to form the corresponding bisoxime, which in turn may be reacted with halogen to form the bis(hydroxamoyl halide). Another method of preparing the bis(hydroxamoyl halides) is to start with the appropriate dialkyl aromatic precursor, e.g., any of the isomers of xylene, which may be reacted with nitrosyl halide, preferably in the presence of additional halogen, to form the bis(hydroxamoyl halides). Other reagents which may be used in place of the nitrosyl halide per se are a combination of nitric acid and hydrohalic acid, or a combination of nitric oxide (NO) and halogen.

This second illustrative method, i.e., the reaction of an appropriate dialkyl aromatic precursor, e.g., m-xylene, with nitrosyl halide or any one of its aforementioned alternatives, is the preferred method for the preparation of the bis (hydroxamoyl halides). This step in combination with the basic process of this invention, i.e., the reaction of the bis (hydroxamoyl halide) with an aromatic diamine results in a relatively simple, easy, relatively inexpensive, over-all process for the preparation of polyamidoximes from readily available starting materials. These polyamidoximes may be converted to PBI type polymers by a ring closure reaction.

The preferred process for the preparation of bis (hydroxamoyl halides) may be conducted at temperatures of from about −10° C. or lower to about 50° C. or higher. The reaction may be conducted at pressures in the range of an atmosphere or more, e.g., up to about 10 atmospheres, preferably from about one to about 5 atmospheres. In view of the corrosive nature of some of the reactants and products, such as nitrosyl halide, it is preferred to conduct the reaction in a reactor fabricated from a material which is inert under the reaction conditions, for example, a glass-lined reactor or one fabricated from titanium or nickel.

To enable the reader to more easily visualize the steps of the invention, the following schemata are set forth, using illustrative reactants. It will be readily apparent to the reader, however, that the other reactants mentioned throughout the specification and claims may be used in their stead.

PREPARATION OF AMIDOXIME POLYMER FROM BIS(HYDROXAMOYL CHLORIDE)

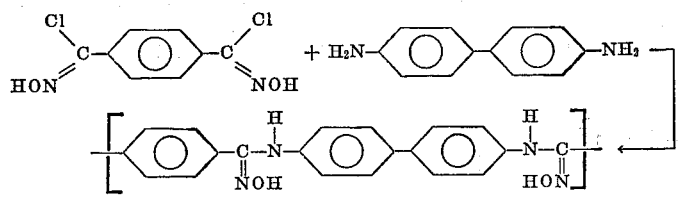

PREPARATION OF POLYBENZIMIDAZOLE FROM AMIDOXIME POLYMER

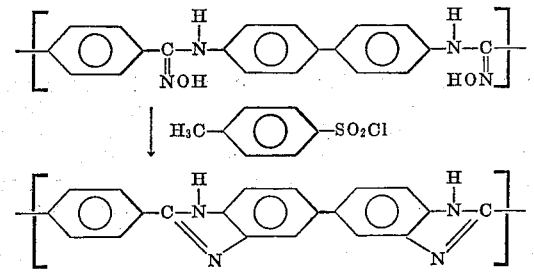

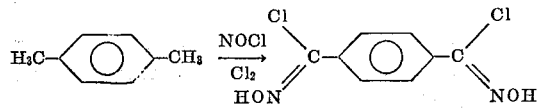

PREPARATION OF BIS(HYDROXAMOYL CHLORIDE) FROM XYLENE

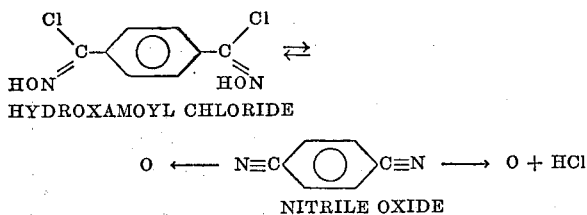

Instead of p-xylene used in the above illustration, one may instead use another aromatic reactant corresponding to the desired aromatic bis(hydroxamoyl halides) described above.

It is possible that a bis(hydroxamoyl halide) may decompose in the presence of certain acid-acceptors in accordance with the following illustrative reaction:

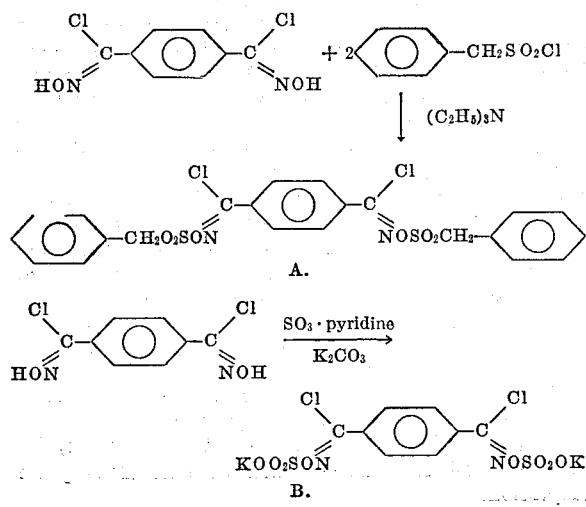

In order to inhibit or eliminate this side reaction, other alternative reactants may be used in place of the bis (hydroxamoyl halide) in the reaction to form amidoxime polymers, e.g., the O-sulfonate derivatives, which may be formed in accordance with the following illustrative schemes.

PREPARATION OF O-SULFONATES OF (BIS) HYDROXAMOYL CHLORIDES

The products in A or B can be reacted with aromatic diamines to give amidoxime —O— sulfonate polymers which can then be converted to polybenzimidazole (PBI) type polymers in manners analogous to those illustrated above wherein bis(hydroxamoyl halides) have been exemplified as the starting materials.

EXAMPLE 1

Preparation of the dioxime of terephthalaldehyde

A weight of 13.4 grams (0.1 mole) of recrystallized terephthaldehyde was dissolved in 150 mls. of 95% ethanol. A weight of 32.8 grams (0.4 mole) of anhydrous sodium acetate was dissolved in 150 mls. of water. To this aqueous solution was added 29.2 grams (0.4 mole) of hydroxylamine hydrochloride. The clear aqueous solution was added to the ethanol solution, and the resulting cloudy solution heated to the boil with stirring. The solution became clear, but on continued boiling the product started to precipitate out. The solution was boiled about 45 minutes and then cooled. More product continued to precipitate on cooling.

The white crystals were collected and dried in a forced-draft oven at 50° C. There were obtained 14.2 grams, or 87% yield. The melting point of the dioxime product was 222° C.

*Analyses.*—Calcd. for $C_8H_8N_2O_2$ (percent): C, 58.5; H, 4.92; N, 17.1; O, 19.5. Found (percent): C, 58.3; H, 4.95; N, 16.7; O, 20.0.

EXAMPLE 2

Preparation of terephthal-bis(hydroxamoyl chloride)

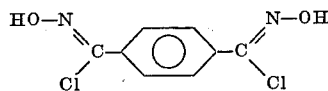

A weight of 16.8 grams of the bis-oxime of Example 1 was dissolved in 50 mls. of DMF, and the solution was cooled in an ice-bath. Chlorine was bubbled into the agitated solution. When no more chlorine was absorbed, as evidenced by flow commencing in the sodium hydroxide wash bottle receiving the exit gases, the chlorine was shut off and the reaction mixture allowed to stand overnight.

The reaction mixture, which was yellow-green in color, was added to excess chloroform and cooled in an icebath. The white crystals were collected and washed with chloroform and air-dried.

The product was recrystallized by suspending in chloroform and boiling the solution for about 30 minutes. The reason for boiling the solution this long was to remove hydrogen chloride from the product. (The bis-oxime tends to form a hydrogen halide on each nitrogen atom.) The solution was filtered. The clear, colorless filtrate was cooled in the refrigerator overnight. White crystals deposited from the solution.

The crystals were collected and air dried at room temperature. There were obtained 14 grams or 55% yield of product. The white crystals melted at 191° C.

*Analyses.* — Calcd. for $C_8H_6N_2O_2Cl_2$ (percent): C, 41.2; H, 2.59; N, 12.0; O, 13.7; Cl, 30.4. Found (percent): C, 41.0; H, 2.71; N, 11.7; O, 13.7; Cl, 30.7.

EXAMPLE 3

Condensation of terephthal-bis (hydroxamoyl chloride) with oxydianiline

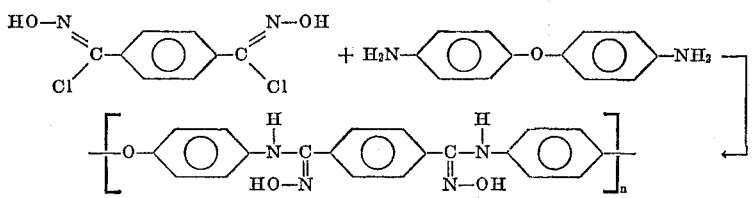

A volume of 100 mls. of DMAc dried over Linde Sieves was purged with dry nitrogen in a reaction flask. A weight of 2.33 grams (0.01 mole) of the terephthal-bis(hydroxamoyl chloride) was dissolved in the solution. A weight of 2.00 grams (0.01 mole) of recrystallized oxydianiline was then added. The solution became clear, but was slightly yellow in color. A weight of 2.52 grams (0.02 mole) of melamine was added. The melamine was insoluble in the reaction mixture and served as the acid-acceptor.

The suspension was agitated at 30–40° C. for 20 hours. It gradually thickened and was like a paste at the end of this reaction time.

The reaction mixture was added to cold water to precipitate the product. The suspension was filtered and the residue washed thoroughly with cold water, followed by hot water to assure removal of melamine and melamine hydrochloride. The light tan residue was then washed with ethanol and finally with ethyl ether.

There were obtained 2.4 grams or 67% yield of a tan powder. The polymer melted at 225° C.

The polymer was readily soluble in DMAc, DMF, m-cresol, N-methyl pyrrolidine and pyridine. It had an I.V. of 0.19 dl./g. measured as a 0.1% solution in DMAc.

*Elemental Analyses.*—Calcd. for $C_{20}H_{16}N_4O_3$ (percent): C, 66.7; H, 4.47; N, 15.6; O, 13.3. Found (percent): C, 61.1; H, 4.45; N, 15.8; O, 13.3.

*Infra-red analyses.*—The polymer was well defined by I. R. Absorption band at 3.1 microns which was due to —OH and —NH. A strong absorption band at 8.3 microns was due to

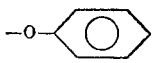

The N—O stretching absorption occurred at 10.2 microns.

EXAMPLE 4

Cyclization of the precursor polymer of Example 3

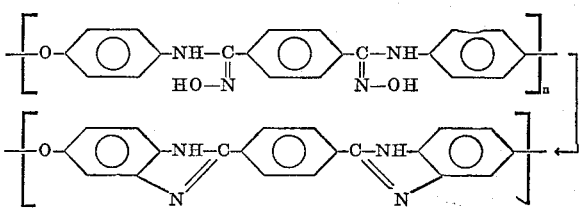

A weight of 0.9 gram of the precursor polymer was dissolved in 10 mls. of pyridine. A weight of 0.44 gram of recrystallized p-toluene sulfonyl chloride was dissolved in a mixture of 5 mls. benzene and 1 ml. pyridine. Both solutions were cooled in an ice-bath and then mixed. The reaction solution was held in the ice-bath for several hours and then placed in a refrigerator (−5° C.) overnight. The solution appeared to become more red in color on standing.

The product was precipitated by adding the solution to ethanol. The light tan flocculent precipitate was collected, washed with alcohol, water and finally alcohol in that order. It air dried to a light tan powder. The yield was 62%.

The physical properties of this polymer were entirely different from those of the precursor polymer. It now was much more difficultly soluble. It was insoluble in DMAc but it did dissolve in DMAc/LiCl on heating.

The polymer was soluble in concentrated sulfuric acid. The I.V. was 0.15 dl./g. in 0.1% solution in conc. $H_2SO_4$.

The melting point of the polymer was 300° C. (Note that the precursor polymer melted at 225° C.)

Thermal gravimetric analyses on this polymer and the precursor polymer showed that the heat stability was increased by cyclization. I.R. data showed that the N—O stretching band at 10.2 microns had decreased, but there was still an absorption band at 3.1 microns for —OH, indicating that partial but not complete ring closure had taken place. This was to be expected because there was used only half the stoichiometric amount of p-toluene sulfonyl chloride required for complete closure. This example shows that it is possible, when desired, to obtain partial ring closure.

EXAMPLE 5

Condensation of terephthal-bis(hydroxamoyl chloride) with benzidine

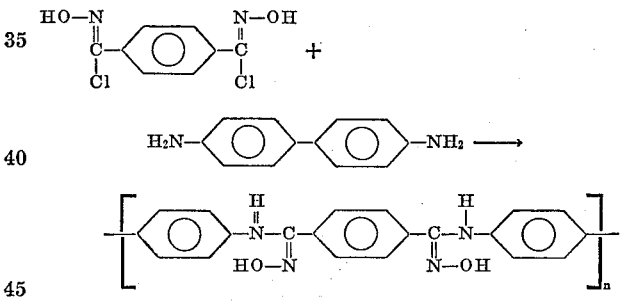

To a reaction flask equipped with stirrer, nitrogen bubbling tube and a dropping funnel were added 100 mls. of cyclohexanone. The nitrogen flow was commenced to sweep out air from the system. A weight of 1.84 grams (0.01 mole) of benzidine was added. This dissolved with slight warming to about 40° C. Then 2.33 grams (0.01 mole) of terephthal-bis (hydroxamoyl chloride) were dissolved in the reaction mixture. A precipitate came out, presumably a low molecular weight polymer having phenylamine hydrochloride end groups. A solution of 2.78 mls. (0.02 mole) of triethylamine in 25 mls. of cyclohexanone was added dropwise from the dropping funnel over a period of about 1½ hours. During this time several changes occurred in the reaction mixture. The original white precipitate that had come out before adding the triethylamine began to dissolve when the triethylamine was slowly added. It appeared also that a new kind of precipitate was forming, which was presumably triethylamine hydrochloride. Then when a large portion of the triethylamine had been added, a considerable amount of white precipitate came out of the solution, which was presumably polymer that was no longer soluble in the reaction mixture. After the addition of all of the triethylamine, the thick white suspension was stirred overnight at 30–35° C.

The reaction mixture was diluted with more cyclohexanone and then filtered through a medium sintered glass funnel. The residue was washed with more cyclohexanone and the filtrates combined after filtering the suspension.

The residue was then washed with alcohol to remove cyclohexanone. After filtering, the residue was washed with water to remove triethylamine hydrochloride. After filtering, the residue was given a final ethanol wash. After the last filtration, the residue was air-dried on the funnel.

There resulted a 76% yield of an off-white polymer. The polymer melted at 325° C. It was soluble in m-cresol and sulfuric acid. The I.V. in m-cresol (0.1% solution) was 0.16 dl./g.

*Elemental analyses.*—Calcd. for $C_{20}H_{16}N_4O_2$ (percent): C, 69.7; H, 4.69; N, 16.2; O, 9.30. Found (percent): C, 74.2; H, 6.30; N, 11.7; O, 7.23.

The I.R. data on this polymer showed the N—O stretching bond at 10.2 microns, but the —OH absorption at 3.1 microns was weak.

The filtrate in the above experiment was added to hexane to precipitate the soluble portion of the polymer. This was collected and washed with hexane, ethanol, water and ethanol in that order. There resulted a 24% yield of a brown-colored powder. This polymer had an I.V. of 0.02 dl./g. in m-cresol.

EXAMPLE 6

To a solution of 18.4 grams (0.1 mole) of benzidine in 300 ml. of dimethylacetamide (DMAc) are added with stirring 23.3 grams (0.1 mole) of a bis (hydroxamoyl chloride) of the formula

The addition is completed in about 20 minutes, and stirring is continued for another hour.

To effect ring closure of the amidoxime polymer to form the polybenzimidazole, the reaction mixture is cooled to about 5° C., and 38.1 grams (0.2 mole) of toluene sulfonyl chloride are added. The reaction mixture is allowed to stand overnight at 5° C., after which water is added and the polymer is filtered, washed with water and methanol, and dried. The washings and filtrate are evaporated for recovery of DMAc and toluene sulfonic acid. (The latter is reconverted to the sulfonyl chloride for reuse by reaction with chlorosulfonic acid).

EXAMPLE 7

To a stirred solution of 10.0 grams (0.05 mol) of oxydianiline (p,p′-diamino diphenyl ether) in 400 ml. dimethylacetamide are added 16.2 grams (0.05 mol) of a bis (hydroxamoyl chloride) of the following structure:

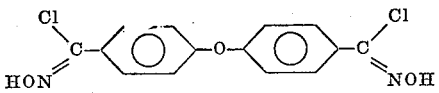

(The latter compound may be prepared by the reaction of NOCl and $Cl_2$ on p,p′-dimethyl diphenyl ether.) The reaction mixture is stirred at 40–50° C. for 2–3 hours after which the mixture is filtered and the amidoxime polymer is washed with water, alcohol and ether.

The polyamidoxime is dissolved in 1,000 ml. of DMAc and the solution is cooled to 10° C. Toluene sulfonyl chloride (19 grams, 0.1 mol) is added as ring closure reagent and the mixture is stirred and allowed to stand overnight at 10° C. Water is added, and the polybenzimidazole is washed and dried.

EXAMPLE 8

A solution of 19.8 grams (0.1 mol) of p,p′-diamino diphenyl methane in 400 ml. of N-methyl pyrrolidone is prepared. To this solution 23.2 grams (0.1 mol) of isophthalhydroxamoyl chloride are added with stirring. After about 3 hours of stirring at 60° C., the mixture is cooled to 5° C. and 38.1 grams (0.2 mol) of toluene sulfonyl chloride are added. The mixture is stirred at 5–10° C. for 12 hours. The polybenzimidazole is filtered, washed and dried.

An alternative route to the above polymer is to first react the isophthalhydroxamoyl chloride with the toluene sulfonyl chloride in the presence of an equivalent amount of triethylamine to produce the O-sulfonate, viz,

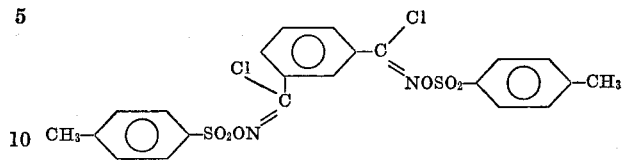

This is then reacted with the above diamine to form the polyamidoxime-sulfonate polymer. Heating in the presence of pyridine hydrochloride to 60° C. causes ring closure to the polybenzimidazole.

EXAMPLE 9

5.4 grams (0.05 mol) of m-phenylene diamine are dissolved in 200 ml. of DMAc. A solution in 200 ml. of DMAc of 15.4 grams (0.05 mol) of a bis(hydroxamoyl chloride) of the following formula is added with stirring. This compound can be prepared by the action of NOCl and $Cl_2$ on a mixture of dimethyl diphenyls, such as may be obtained by a coupling reaction of toluene, and has the following general structure:

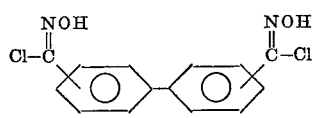

The reaction mixture is stirred at 60–70° C. for about 3 hours. The mixture is then cooled to 5–10° C. and 19 grams (0.1 mol) of toluene sulfonyl chloride are added. After standing overnight at 10° C., the polybenzimidazole is filtered off, washed and dried.

EXAMPLE 10

Preparation of terephthalbis(hydroxamoyl chloride)

A mixture of nitrosyl chloride and chlorine is generated from conc. nitric and hydrochloric acids:

$$HNO_3 + 3HCl \rightarrow NOCl + Cl_2 + 2H_2O$$

The NOCl and $Cl_2$ are passed in gaseous form into a separate glass vessel containing a mixture of p-xylene and sufficient amounts of carbon tetrachloride, to maintain solubility of reactive intermediates maintained at 15° C. An ultraviolet lamp irradiates the reaction mixture for 2 to 3 hours. The mixture is filtered to remove the crude terephthalbis(hydroxamoyl chloride), which is then recrystallized several times from chloroform to yield colorless leaflets melting with decomposition at 188° C. The procedure is repeated on the original xylene-$CCl_4$ mother liquor with make-up for reacted xylene. Also, by-products from the chloroform mother liquors, such as terephthaldialdoxime, xylylene dichloride, methyl benzaldoxime and methyl benzhydroxamoyl chloride, etc., may be recycled for retreatment.

EXPERIMENT 1

Unsuccessful attempt to condense terephthal-bis (hydroxamoyl chloride) with oxydianiline A weight of 2.22 grams (0.01 mole) of terephthal-bis (hydroxamoyl chloride) and 2.00 grams (0.01 mole) of recrystallized oxydianiline were dissolved in 100 mls. of dry, oxygen-free DMAc. A stoichiometric amount of 2,5-dimethyl lutidine (freshly distilled) was added to the solution and the solution heated at 60° C. for 4 hours. The solultion became dark in color. The reaction mixture was added to water, which precipitated the product. However, when the brown solid was collected it was found to be soluble in ethanol.

This experiment teaches the fact that a tertiary amine acid acceptor that is soluble in the reaction mixture and is added all at once will not give polymer. It is believed that the reason for this is the following side reaction that takes place in the presence of excess base:

$$R-C\begin{subarray}{c}N-OH\\ \diagdown\\ Cl\end{subarray} \xrightarrow{\text{Tertiary Amine}} R-C\equiv N^+-O^- \text{ or } R-C=\!\!=\!\!\begin{subarray}{c}N\\ \diagdown\\ O\end{subarray}$$

It further points to the fact that the success of melamine as an acid-acceptor was due to the insolubility of melamine in the reaction mixture, thereby at least minimizing the above side reaction. If a soluble acid-acceptor is used, it should be added very slowly to the reaction mixture to produce polymer as described in Example 5. The slow addition prevents a build-up of excess acid-acceptor that would enhance the above side reaction.

EXPERIMENT 2

Preparation of terephthal-bis(N-acetylated hydroxamoyl chloride)

$$AcO-N=\!\!C(C_6H_4)C=\!\!N-OAc$$
         Cl              Cl

A weight of 4.66 grams (0.02 mole) of terephthal-bis (hydroxamoyl chloride) was dispersed in a mixture of 25 mls. of acetic acid and 25 mls. of acetic anhydride. Two drops of conc. $H_2SO_4$ were added. The compound slowly dissolved, and a slight exotherm occurred as acetylation took place. There resulted a clear solution at about 35–40° C.

When the solution was cooled, crystals readily came out. These were collected and washed with petroleum ether. There was obtained 5.7 grams of product, or 90% yield of the acetylated derivative.

The acetylated derivative melted at 152° C. The elemental analyses were as follows:

Calcd. for $C_{12}H_{10}N_2O_4Cl_2$ (percent): C, 41.0; H, 3.44; N, 9.56; O, 21.8; Cl, 24.2. Found (percent): C, 45.3; H, 3.09; N, 8.69; O, 20.3; Cl, 23.5.

What is claimed is:

1. A process for the preparation of amidoxime polymers which comprises reacting
    (A) an aromatic diamine with
    (B) a bis(hydroxamoyl halide) having the following formula:

$$\begin{array}{c}X\\ \diagdown\\ X'ON\end{array}C-R''-C\begin{array}{c}X\\ \diagup\\ NOX'\end{array}$$

wherein X is halogen or —$OC_6H_5$, —OR''' or —SR''' (R''' being alkyl containing up to 4 carbon atoms); R'' is a direct bond or a divalent aliphatic, aromatic or an organosilicon group selected from the group consisting of $$-\overset{CH_3}{\underset{CH_3}{Si}}-,\ -\overset{C_2H_5}{\underset{C_2H_5}{Si}}-,\ \text{or}\ -\overset{C_6H_5}{\underset{C_6H_5}{Si}}-$$

and X' is hydrogen or an —$SO_2OK$, —$SO_2ONa_3$ $$-SO_2-\langle O \rangle,\ -SO_2-\langle O \rangle^{R'''},$$

$$-SO_2-CH_2-\langle O \rangle,\ -SO_2-CH_3$$

or $$-\overset{O}{\underset{\|}{C}}R'''$$

group, at a temperature of from about 0° to about 250° C. for a period of time sufficient to form the polymer.

2. The process of claim 1 wherein the bis(hydroxamoyl halide) has the formula:

$$\begin{array}{c}X\\ \diagdown\\ HON\end{array}C-R''-C\begin{array}{c}X\\ \diagup\\ NOH\end{array}$$

wherein X is halogen and R'' is a divalent aliphatic, aromatic or an organosilicon group selected from the group consisting of $$-\overset{CH_3}{\underset{CH_3}{Si}}-,\ -\overset{C_2H_5}{\underset{C_2H_5}{Si}}-,\ \text{or}\ -\overset{C_6H_5}{\underset{C_6H_5}{Si}}-$$

3. The process of claim 2 wherein X is bromine or chlorine and R'' is a divalent aliphatic or aromatic group.

4. The process of claim 3 wherein R'' is a divalent aliphatic group containing up to about 4 carbon atoms or a divalent aromatic group containing up to about 18 carbon atoms.

5. The process of claim 1 wherein the aromatic diamine contains up to about 30 carbon atoms.

6. The process of claim 1 wherein the aromatic diamine contains up to about 20 carbon atoms.

7. The process of claim 1 wherein the aromatic diamine has the formula:

$$H-\overset{R}{\underset{}{N}}-Y-\overset{R}{\underset{}{N}}-H$$

wherein R in each instance is independently hydrogen or a hydrocarbyl group containing up to about 8 carbon atoms; Y is —$C_6H_4$—, —$C_{10}H_6$—, —$C_{14}H_8$—, —$C_6H_4$—$C_6H_4$—, —$C_6H_4$—R'—$C_6H_4$—, wherein R' is $$-CH_2-,\ -\overset{O}{\underset{\|}{C}}-,\ -\overset{O}{\underset{\|}{S}}-,\ -\overset{O}{\underset{\|}{\underset{O}{S}}}-,\ -\overset{CH_3}{\underset{CH_2}{C}}-,\ -S-,\ -O-,\ -\overset{H}{\underset{}{N}}-,$$

$$-CH_2-\langle S \rangle-CH_2-,\ \langle S \rangle,\ -\overset{CH_3}{\underset{CH_3}{Si}}-,\ -\overset{C_2H_5}{\underset{C_2H_5}{Si}}-,\ \text{or}\ -\overset{C_6H_5}{\underset{C_6H_5}{Si}}-.$$

8. The process of claim 1 wherein an acid-acceptor is present during the reaction.

9. The process of claim 8 wherein the acid-acceptor is melamine, dicyanamide or benzoguanamine.

10. The process of claim 1 wherein there is present during the reaction a solvent selected from the group consisting of acetonitrile, nitromethane, nitrobenzene, methylene chloride, chloroform, carbon tetrachloride, ethylene chloride, chlorobenzene, $N_2O_4$, tetrahydrofurane, diethyl ether, dioxane, amyl acetate, butyrolactone, cyclopentanone, cyclohexanone, acetic acid, polyphosphoric acid and cresols.

11. The process of claim 10 wherein the solvent is cyclohexanone.

12. The process of claim 1 wherein there is present during the reaction a solvent which also functions as an acid-acceptor, selected from the group consisting of dimethylacetamide, dimethylformamide, pyrrolidone, N-methylpyrrolidone, dimethyl sulfoxide, hexamethylpyrrolidone, and N,N-dimethylaniline.

13. The process of claim 1 wherein the reaction is conducted at a temperature of from about 0° C. to about 100° C.

14. The process of claim 1 wherein the bis(hydroxamoyl halide) is prepared for reacting a dialkyl aromatic compound with nitrosyl halide for a period of time sufficient to form the product.

15. The process of claim 14 wherein the nitrosyl halide is nitrosyl chloride or nitrosyl bromide.

16. The process of claim 14 where there is additional halogen present in the reaction mixture.

17. The process of claim 14 wherein the temperature of the reaction is from about —10° C. to about 50° C.

18. The process of claim 1 wherein the bis(hydroxamoyl halide) is prepared by reacting an aliphatic or aromatic dialdehyde with hydroxylamine to form the corresponding bisoxime, which is then reacted with halogen to form the bis(hydroxamoyl halide), each reaction step being conducted at a temperature of from 0° to 100° C.

19. The process of claim 1 wherein the amidoxime polymers are contacted with a sulfonyl halide selected from benzene sulfonyl chloride, toluene sulfonyl chloride, napthalene sulfonyl chloride, or methane sulfonyl chloride at a temperature of about 0° C. to 90° C. for a period of time sufficient to convert at least some of the amidoxime groups to benzimidazole groups.

20. A film forming polyamidoxime polymer consisting essentially of repeating units of the formula:

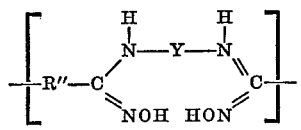

wherein R″ is a direct bond or a divalent aliphatic, aromatic or an organosilicon group selected from

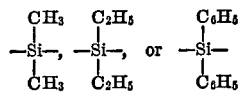

and Y is

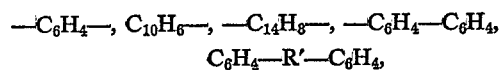

wherein R′ is

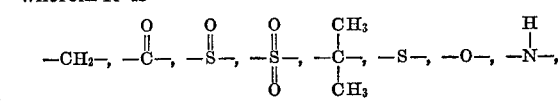

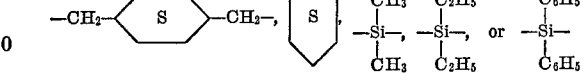

21. The polyamidoxime of claim 20 wherein R″ is a divalent aliphatic radical containing up to about 4 carbon atoms.

22. The polyamidoxime of claim 20 wherein R″ is a divalent aromatic radical containing up to about 18 carbon atoms.

References Cited
UNITED STATES PATENTS 3,503,906   3/1970   Brack _____ 260—2.5
3,560,438   2/1971   Burton et al. _____ 260—47

WILLIAM H. SHORT, Primary Examiner

L. L. LEE, Assistant Examiner

U.S. Cl. X.R.

260—2 R, 30.2, 30.6 R, 30.8 DS, 31.2 N, 32.4, 32.6 N, 32.8 N, 33.7 R, 47 R, 47 CP, 448.2 B, 448.2 N, 453 R, 456 A, 488 CD, 566 D